(12) United States Patent
Holst et al.

(10) Patent No.: US 8,445,052 B2
(45) Date of Patent: May 21, 2013

(54) PROCESS FOR PRODUCING LACTOSE-FREE MILK

(75) Inventors: Hans Henrik Holst, Videbæk (DK); Karsten Lauritzen, Herning (DK)

(73) Assignee: ARLA Foods AMBA, Viby J (DK)

( * ) Notice: Subject to any disclaimer, the term of this patent is extended or adjusted under 35 U.S.C. 154(b) by 684 days.

(21) Appl. No.: 12/244,543

(22) Filed: Oct. 2, 2008

(65) Prior Publication Data

US 2009/0092731 A1    Apr. 9, 2009

Related U.S. Application Data

(60) Provisional application No. 60/960,543, filed on Oct. 3, 2007.

(30) Foreign Application Priority Data

Oct. 3, 2007 (DK) ................................. 2007 01423

(51) Int. Cl.
*A23C 9/154* (2006.01)

(52) U.S. Cl.
USPC ............................................ 426/580; 426/34

(58) Field of Classification Search
USPC ........................................................ 426/580
See application file for complete search history.

(56) References Cited

U.S. PATENT DOCUMENTS

| | | | |
|---|---|---|---|
| 4,529,611 A | 7/1985 | Uiterwaal | |
| 4,820,348 A | 4/1989 | Harju | |
| 4,853,246 A | 8/1989 | Stevens | |
| 2,349,227 A | 5/1994 | Thorneloe et al. | |
| 5,685,990 A * | 11/1997 | Saugmann et al. | 210/650 |
| 5,711,982 A | 1/1998 | Takemori et al. | |
| 5,912,032 A | 6/1999 | Komatsu et al. | |
| 6,051,268 A | 4/2000 | Mahmoud et al. | |
| 6,139,901 A | 10/2000 | Blazey et al. | |
| 6,288,222 B1 | 9/2001 | Roth et al. | |
| 6,350,481 B1 | 2/2002 | Kawachi et al. | |
| 6,399,140 B1 | 6/2002 | Allen et al. | |
| 6,475,390 B1 | 11/2002 | Durham et al. | |
| 6,635,302 B1 | 10/2003 | Huang et al. | |

(Continued)

FOREIGN PATENT DOCUMENTS

| | | | |
|---|---|---|---|
| BG | 64031 B1 | 5/2002 | |
| CN | 1084700 A | 4/1994 | |

(Continued)

OTHER PUBLICATIONS

Asia Pacific Food Industry, Jul. 2006, pp. 64-66: Value Added Milk : The Lactose-Free Way to go.*

(Continued)

*Primary Examiner* — Patricia George
(74) *Attorney, Agent, or Firm* — Foley & Lardner LLP

(57) ABSTRACT

The invention concerns a process for producing lactose-free or substantially lactose-free milk, preferably without addition of water, and the product obtainable by the process. The process comprises the steps of:
 a) Ultrafiltration of original milk to obtain a first permeate and a first retentate;
 b) Nanofiltration of said first permeate to obtain a second permeate and a second retentate;
 c) Mixing said first retentate with said second permeate to obtain a mixture; and
 d) Hydrolysing remaining lactose in said mixture to obtain a hydrolysed milk.

The process provides a lactose-free product with the taste of the original milk.

20 Claims, 3 Drawing Sheets

Continuous process

U.S. PATENT DOCUMENTS

| | | | |
|---|---|---|---|
| 6,881,428 B2 | 4/2005 | Lange | |
| 7,169,428 B2 | 1/2007 | Dunker et al. | |
| 7,829,130 B2* | 11/2010 | Tossavainen et al. | 426/580 |
| 2002/0025361 A1 | 2/2002 | Kawachi et al. | |
| 2002/0148791 A1 | 10/2002 | DeGrees | |
| 2005/0053707 A1* | 3/2005 | Kopf et al. | 426/491 |
| 2005/0196508 A1* | 9/2005 | Wang | 426/580 |
| 2005/0276904 A1 | 12/2005 | Brown et al. | |
| 2006/0057247 A1 | 3/2006 | Nguyen et al. | |
| 2007/0166447 A1 | 7/2007 | Ur-Rehman et al. | |

FOREIGN PATENT DOCUMENTS

| | | |
|---|---|---|
| CN | 1757289 | 4/2006 |
| CN | 1757298 A | 4/2006 |
| CN | 1784998 A | 6/2006 |
| DE | 2354475 A1 | 5/1974 |
| EP | 0 203 706 A2 | 12/1986 |
| EP | 0 273 485 A2 | 7/1988 |
| EP | 0 316 938 AW | 5/1989 |
| EP | 0 536 612 A1 | 4/1993 |
| EP | 0 785 726 B1 | 10/1995 |
| EP | 1 046 344 B1 | 10/2000 |
| EP | 1147712 A2 | 10/2001 |
| EP | 1 031 288 B1 | 12/2004 |
| EP | 1255445 B1 | 4/2005 |
| ES | 2183711 | 3/2003 |
| FR | 2125137 A5 | 9/1972 |
| FR | 2 809 595 | 12/2001 |
| GB | 1 441 143 | 6/1976 |
| GB | 2 130 068 A | 5/1984 |
| GB | 2 130 069 A | 5/1984 |
| GB | 2404560 B | 9/2006 |
| IE | 20030564 A2 | 1/2004 |
| IE | 20030563 A1 | 2/2005 |
| JP | 02-303450 A | 12/1990 |
| JP | 03-83564 A | 4/1991 |
| JP | 06-105651 A | 4/1994 |
| JP | 06-303900 A | 11/1994 |
| JP | 08-256682 A | 10/1996 |
| JP | 11-028056 A | 2/1999 |
| JP | 2002-0291 A | 1/2002 |
| JP | 2002-315506 A | 10/2002 |
| KR | 2001-0091297 A | 10/2001 |
| KR | 2004-0103818 A | 12/2004 |
| SU | 1324622 A1 | 7/1987 |
| SU | 1358889 A1 | 12/1987 |
| WO | WO 93/22037 A1 | 11/1993 |
| WO | WO 96/08155 A1 | 3/1996 |
| WO | WO 98/15581 A1 | 4/1998 |
| WO | WO 98/48636 A1 | 11/1998 |
| WO | WO 00/45643 A1 | 8/2000 |
| WO | WO 00/51440 A1 | 9/2000 |
| WO | WO 01/93689 A1 | 12/2001 |
| WO | WO 03/094623 A1 | 11/2003 |
| WO | WO 2004/019693 A2 | 3/2004 |
| WO | WO 2004/075667 A2 | 9/2004 |
| WO | WO 2005/039299 A2 | 5/2005 |
| WO | WO 2005/074693 A1 | 8/2005 |
| WO | WO 2006/012506 A1 | 2/2006 |
| WO | WO 2006/058083 A2 | 6/2006 |
| WO | WO 2006/087409 A1 | 8/2006 |
| WO | WO 2007/021204 A1 | 2/2007 |
| WO | WO 2007/068253 A2 | 6/2007 |
| WO | WO 2007/076873 A1 | 7/2007 |
| WO | WO 2009/043877 A1 | 4/2009 |
| WO | WO 2009/043882 A1 | 4/2009 |

OTHER PUBLICATIONS

DietFacts.com: PediaSure Balance Nutrition Drinks, Strawberry flavored for kids; last updated Nov. 18, 2006.*

Messia: Assessment of quality and technological characterization of lactose-hydrolyzed milk; Food Chemistry 104 (2007) 910-917; Received Aug. 4, 2006; received in revised form Oct. 12, 2006; accepted Dec. 18, 2006.*

Aiestaran et al., "Leches Bajas En Lactosa Utilidad Dietetico-Sanitaria E Indicaciones", Alimentaria, 1997, No. 285, pp. 51-59.

Chen et al., "Optimization of the enzymic process for manufacturing low-lactose milk containing oligosaccharides", Process Biochemistry, 2002, vol. 38, pp. 801-808.

Glover, F.A., "Concentraion of milk by ultrafiltration and reserve osmosis", J. Dairy Res. 1971, vol. 38, pp. 373-379.

Gonzalez et al., "Obtencion de Leche Deslactosada para Lactantes", 1993, No. 239, pp. 67-71.

International IDF Standard, "Milk, Determination of fat content, Gravimetric Method (reference method)", Dec. 1996.

Patel et al., "Manufacture of low-lactose powder using ultrafiltration technology", Legensm.-Wiss. U. Techonol., 1991, vol. 24, pp. 338-340.

Roger et al., "Hydrolyse du lactose contenu dans l'ultrafiltrat de lait ou de lactoserum en reacteur enzymatique a membrane", Ann. Nutr. Alim., 1978, vol. 32, pp. 657-669.

Sullivan et al., "Sugars (mono & Di)", Methods of analysis for nutrition labeling, 1993, Chapter 33, pp. 455-533.

* cited by examiner

Batch process

Continuous process

PROCESS FOR PRODUCING LACTOSE-FREE MILK

TECHNICAL FIELD OF THE INVENTION

The present invention relates to a process for producing lactose-free or substantially lactose-free milk, and the product obtainable by the process.

BACKGROUND OF THE INVENTION

The International patent application WO 03/094623, in the name of Valio Ltd, discloses a process for manufacturing a lactose-free milk product, comprising ultrafiltering, nanofiltering and reverse osmosis, followed by hydrolyzing the milk product. In the disclosed process a large amount of the original milk is lost.

U.S. Pat. No. 6,881,428 B2 discloses a method for producing milk with less than about 0.2% lactose by inter alia ultra filtration and ultrafiltration/diafiltration, wherein water is added upon subjecting the retentate to diafiltration.

US patent application 2005/0196508 discloses a sequential filtration process for producing a lactose-removed milk product. The obtained product is indicated to comprise 0.23% lactose.

The International patent application WO 2007/076873, in the name of Aria Foods amba, discloses a process for producing lactose-reduced milk comprising pH adjustment followed by ultrafiltration and nanofiltration; addition of water, and subsequent adjustment of pH. The amount of lactose in the final product is indicated to be 2.0%.

SUMMARY OF THE INVENTION

The inventors of the present invention have identified a number of problems and unmet needs associated with known manufacturing methods for lactose-free or substantially lactose-free milk and known lactose-free or substantially lactose-free milk products.

A simplified process for manufacturing lactose-free or substantially lactose-free milk would be desirable. Any simplification in the manufacturing process may provide cost advantages.

A lactose-free milk with the taste and/or sweetness of the original milk is needed. Further, there exists a consumer demand for milk products produced without the use of components not originating from milk. Any components not originating from milk have to be declared independently on the packaging of the milk. Hence, dispensing with any component, not originating from milk, is desirable.

Furthermore, there exists a need for an efficient process, wherein the loss of original milk is limited.

An object of the present invention relates to providing a simple process for producing a lactose-free or a substantially lactose-free milk product. In particular, it is an object of the present invention to provide a process that solves the above mentioned problems of the prior art with cumbersome manufacturing procedures.

Another object of the present invention relates to providing a lactose-free or a substantially lactose-free milk product, e.g. comprising less than 0.05%, preferably less than 0.01% lactose, produced from original milk and retaining the taste and sweetness of the original milk. This may be accomplished by having calcium content and protein content in the same range as the original milk, and optionally adjusting the sweetness. According to an aspect of the present invention, milk with different contents of fat may be obtained, such as 0.1-3.5%, preferably about 0.1, 0.5, 1.0, 1.5, 3.0 or 3.5%.

One aspect of the invention relates to a process for producing lactose-free or substantially lactose-free milk, preferably without addition of water, comprising the steps of:
a) Ultrafiltration of original milk to obtain a first permeate and a first retentate;
b) Nanofiltration of said first permeate to obtain a second permeate and a second retentate;
c) Mixing said first retentate with said second permeate to obtain a mixture; and
d) Hydrolysing remaining lactose in said mixture to obtain a hydrolysed milk.

The hydrolysed milk is lactose-free or substantially lactose-free milk.

Surprisingly, this simple process may provide a milk product, with the same sweetness, taste and/or organoleptic properties as the original milk.

No reverse osmosis needs to be undertaken. The absence of a reverse osmosis step after the nanofiltration step b) and before the hydrolysing step d) is associated with a number of advantages. Firstly, it renders the process simpler and therefore less expensive than known processes. Further, it provides a highly reliable process, which gives less variance in the final product of parameters such as ash, calcium, chloride, sodium and potassium than known processes. It may further provide less variance in parameters such as calcium, enzymatic lactose, and protein. This may be due to the simplicity of the process, and the fact that no non-milk ingredients need to be added during the process. A disadvantage associated with the addition of non-milk ingredients, is that such ingredients would usually need to be declared on the milk product package. An additional advantage of the present process is the reduction of loss, in particular the loss of protein.

The process may provide for a product with calcium contents about the recommended nutritional value of 120 mg/100 g milk, such as 110-130 mg/100 g, preferably 115-125 mg/100 g. The process may provide for a product with carbohydrate contents of less than 3.4, preferably less than 3.3, more preferred less than 3.2, preferably less than 3.1, more preferred less than 3.0, preferably less than 2.9 g/100 ml. The process may provide for a product with reduced amounts of sodium and chloride, which may be recommendable and desirable, such as a chloride contents selected among 88-90, 85-95, 80-100, and 75-105 mg/100 ml and/or a sodium contents selected among 33-34, 32-35, 30-40, 25-45, and 20-50 mg/100 ml.

The original milk may suitably be skimmed milk. The first permeate would typically comprise lactose, minerals, non-protein nitrogen (NPN) and water. The first retentate would typically comprise fat, proteins, NPN, minerals, lactose and water. The second permeate would typically comprise water, monovalent mineral ions and NPN. The second retentate would typically comprise lactose, polyvalent mineral ions, NPN and water.

The process may be used to provide a lactose-free product with the taste of the original milk.

Another aspect of the present invention relates to a process, preferably without adding water, for producing lactose-free or substantially lactose-free milk at the pH of milk, comprising the steps of:
a) Ultrafiltration of original milk to obtain a first permeate and a first retentate;
b) Nanofiltration of said first permeate to obtain a second permeate and a second retentate;
c) Mixing said first retentate with said second permeate to obtain a mixture; and d) Hydrolysing remaining lactose in said mixture to obtain a hydrolysed milk.

Yet another aspect of the present invention is to provide a process, preferably without adding water, for producing lactose-free or substantially lactose-free milk, comprising the steps of:
   a) Ultrafiltration of original milk at the pH of the original milk to obtain a first permeate and a first retentate;
   b) Nanofiltration of said first permeate to obtain a second permeate and a second retentate;
   c) Mixing said first retentate with said second permeate to obtain a mixture; and
   d) Hydrolysing remaining lactose in said mixture to obtain a hydrolysed milk.

Still another aspect of the present invention is to provide a dairy product and/or a milk product obtainable by the process according to the invention, wherein the calcium content in the dairy product is about that of the original milk.

The original milk used in the process may be processed or unprocessed milk originating from a mammal, such as a cow, a goat or a sheep, but has preferably been subjected to skimming and/or standardization, providing skimmed milk or partially skimmed milk. It may further have been subjected to thermal treatment and/or filtering. Such methods are inter alia described in U.S. Pat. No. 6,350,481 B1, U.S. Pat. No. 6,881,428 B2 and WO 2005/074693 A1.

The milk obtained from the process may be subjected to further processing, e.g. to obtain another dairy product.

According to an aspect, the invention concerns a milk product obtainable by a process according to the invention.

Another aspect of the invention concerns providing a lactose-free or substantially lactose-free milk product, wherein the protein concentration and/or calcium concentration in the obtained milk is about that of the original milk.

Another aspect of the invention concerns providing a lactose-free or substantially lactose-free milk, obtained without addition of water, having the same organoleptic properties as the original milk, wherein the calcium concentration is 0.11-0.13% and the protein concentration is 3.0-4.0%.

Another aspect of the invention concerns providing a lactose-free or substantially lactose-free milk, preferably obtained without addition of water, having the same organoleptic properties as the original milk, wherein the protein concentration and/or the calcium concentration of the obtained milk are about the concentrations of the original milk.

According to an aspect of the invention it concerns a process for providing a lactose-free or substantially lactose-free milk, or said product, preferably obtained without addition of water, wherein the protein concentration of the obtained milk is within a range selected among 50-200%; 60-150%; 70-130%; 80-120%; 90-110%; 95-105%; 97-103% of the protein concentration of the original milk.

According to an aspect of the invention it concerns a process for providing a lactose-free or substantially lactose-free milk, or said product, preferably obtained without addition of water, wherein the calcium concentration of the obtained milk is within a range selected among 50-200%; 60-150%; 70-130%; 80-120%; 90-110%; 95-105%; 97-103% of the calcium concentration of the original milk.

According to an aspect of the invention, the protein and/or calcium in the obtained milk is of the same origin as the original milk, such that addition of external protein and/or calcium is not necessary.

Figure 1:
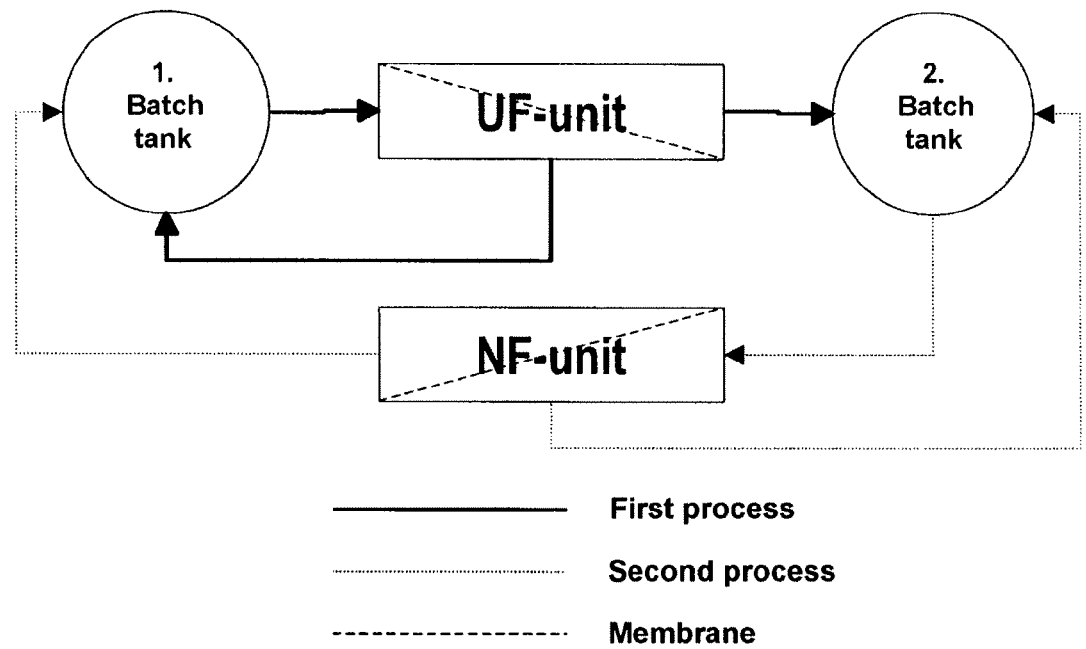
FIG. 1 illustrates an embodiment of the present invention. Prior to the illustrated First process step original milk has been filled into Batch tank 1. In a First process step ultrafiltration provides a first rententate, which is led back to Batch tank 1, and a first permeate, which is led to Batch tank 2. After the First process step, in a Second process step, nanofiltration provides a second retentate, which is led back to Batch tank 2, and a second permeate, which is led to Batch tank 1. After the Second process step, the product present in Batch tank 1 is hydrolysed to obtain a final product, which may be heat treated. The contents of Batch tank 2 may be discarded or used for other purposes.
Figure 2:
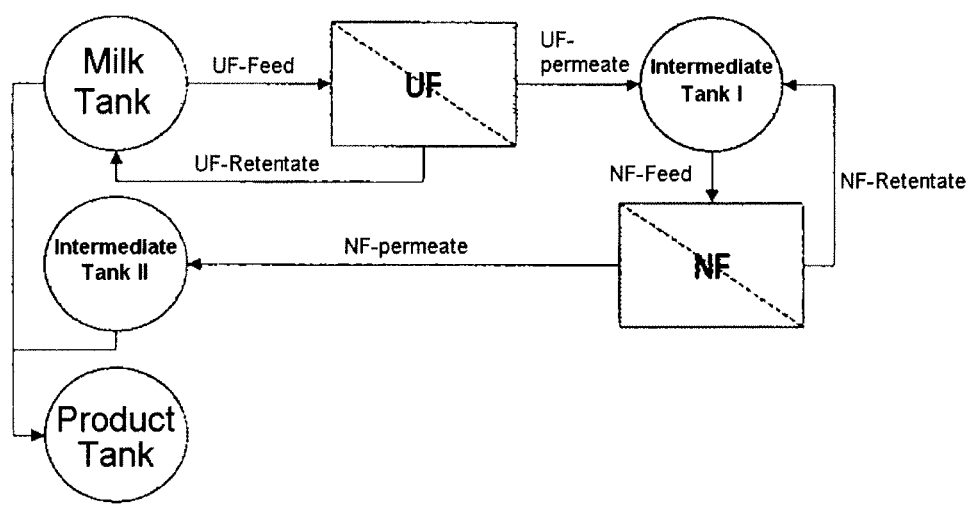
FIG. 2 illustrates an embodiment of the invention. The Milk Tank serves as a first batch tank, while the Intermediate Tank I serves as a second batch tank. The illustrated process uses 4 tanks and 2 single stage filtration units. The illustrated Batch process enables the filtration units to operate almost entirely independent, with the proviso that the UF stage should be started before the NF stage, as the UF stage provides feed for the NF stage. When the UF and NF stages are completed, a standardisation is performed, and the products are mixed in the Product Tank, before further processing.
Figure 3:
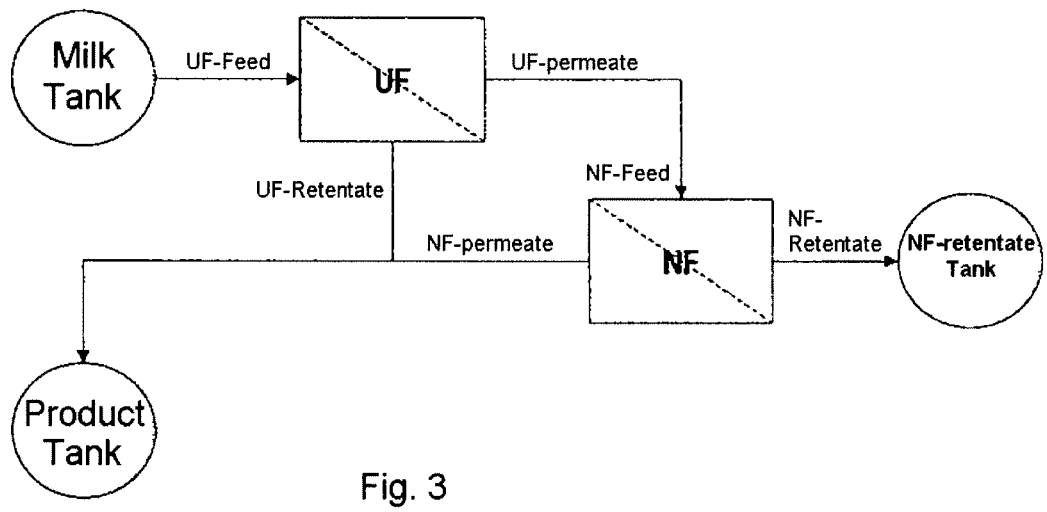
FIG. 3 illustrates an embodiment of the invention. The illustrated Continuous process uses 3 and 2 multi stage filtration devices. There is no intermediate tank, which may serve as a buffer between the UF and NF devices. Hence, the devices have to be accurately adjusted to each other in order to obtain a stable production. The UF device will determine the primary capacity, and the NF device has to be dimensioned accordingly. Dimensioning of the NF device with a too low capacity may result in loss of NF permeate, as the NF retentate amount becomes too large. Hence, NF permeate will be lacking at the end of the production. Accordingly, the dimensioning and correct operation of the devices is critical for the Continuous process.

The present invention will now be described in more detail in the following.

DETAILED DESCRIPTION OF THE INVENTION

Further aspects, embodiments and features of the invention are described below.

According to an embodiment, the invention concerns a process, wherein the loss of original milk product is selected among less than 30%, preferably less than 25%, more preferred less than 20%, and preferably less than 15%. Most preferred the loss of original milk product, which does not become part of the hydrolysed milk, is about 10% or less. The efficacy of the process may be defined as the total amount of original milk to become part of the final product divided by the total amount of original milk processed. The loss is defined as one minus the efficacy.

According to an embodiment, the invention concerns the process, wherein the concentration coefficient of step a) is at least a value selected among 1.5; 1.6; 1.7; 1.8; 1.9; 2.0; 2.1; 2.2; 2.3; 2.4; 2.5; 2.6; 2.7; 2.8; 2.9; and 3.0. Preferably the concentration coefficient of step a) is at least 1.7, more preferred at least 1.8, preferably at least 1.9.

The concentration coefficient is defined as the weight ratio between the liquid feed to the filtration and the retentate.

According to an embodiment, the invention concerns the process, wherein the concentration coefficient of step a) is less than a value selected among 1.5; 1.6; 1.7; 1.8; 1.9; 2.0; 2.1; 2.2; 2.3; 2.4; 2.5; 2.6; 2.7; 2.8; 2.9; 3.0; 3.1; 3.2; 3.3; 3.4; 3.5; 3.6; 3.7; 3.8; 3.9; and 4.0. Preferably the concentration coefficient of step a) is less than 2.5, more preferred less than 2.2, preferably less than 2.1.

According to an embodiment, the invention concerns the process, wherein the concentration coefficient of step a) is a value in an interval selected among 1.0-3.0; 1.1-2.9; 1.2-2.8; 1.3-2.7; 1.4-2.6; 1.5-2.5; 1.6-2.4; 1.7-2.3; 1.8-2.2; 1.9-2.1 and preferably about 2.0. Preferably the concentration coefficient of step a) is in the interval 1.8-2.2, more preferred 1.9-2.1, preferably about 2.0.

According to an embodiment, the invention concerns the process, wherein the concentration coefficient of step b) is at least a value selected among 2.0; 2.2; 2.4; 2.6; 2.8; 3.0; 3.2; 3.4; 3.6; 3.8; 4.0; 4.2; 4.4; 4.6; 4.8; and 5.0. Preferably the concentration coefficient of step b) is at least 3.5, more preferred at least 3.7, preferably at least 3.9, more preferred at least 4.0.

The concentration coefficient in step b) should be sufficiently high in order to avoid addition of water in the process.

According to an embodiment, the invention concerns the process, wherein the concentration coefficient of step b) is less than a value selected among 2.4; 2.6; 2.8; 3.0; 3.2; 3.4; 3.6; 3.8; 4.0; 4.2; 4.4; 4.6; 4.8; 5.0; 5.2; 5.4; 5.6; 5.8; and 6.0. Preferably the concentration coefficient of step b) is less than 4.7, more preferred less than 4.5, preferably less than 4.3, more preferred less than 4.2.

According to an embodiment, the invention concerns the process, wherein the process is conducted as a batch process or a continuous process.

According to an embodiment, the invention concerns the process, wherein the process is conducted as a continuous process, and the concentration coefficient of step a) is a value in an interval selected among 1.8-2.2; and preferably 1.9-2.1; more preferred about 2.0.

According to an embodiment, the invention concerns the process, wherein the process is conducted as a continuous process, and the concentration coefficient of step b) is a value in an interval selected among 3.5-4.7; preferably 3.7-4.5; more preferred 3.8-4.4; preferably 3.9-4.3; and more preferred 4.0-4.2; preferably about 4.1.

According to an embodiment, the invention concerns the process, wherein no water is added during the process. Hence, a final product may be obtained without the addition of water. This provides for higher calcium contents in the final product.

According to an embodiment, the invention concerns the process, wherein no minerals and/or salts are added during the process. Hence, a final product may be obtained without the addition of minerals and/or salts.

According to an embodiment, the invention concerns the process, wherein no base and/or no acid is added. According to an embodiment, the invention concerns the process, wherein the pH is not adjusted.

According to an embodiment, the invention concerns the process, wherein the pH is kept within a range selected among the ranges 5.5-7.5; 6.0-7.0; 6.6-6.9; and 6.7-6.8. Preferably the pH is in the range 6.0-7.0, more preferred 6.6-6.9, preferably 6.7-6.8.

According to an embodiment, the invention concerns the process, wherein the concentration of lactose in said first retentate is 2-6%, preferably 4-5%.

Unless otherwise mentioned all percentages are in weight/weight.

According to an embodiment, the invention concerns the process, wherein the concentration of lactose in said second retentate is 10-30%, preferably 16-20%, more preferred 17-19%.

According to an embodiment, the invention concerns the process, wherein the concentration of lactose in the mixture of said first retentate and said second permeate is 1.5-4%, preferably 2-3%.

According to an embodiment, the invention concerns the process, wherein the mixing ratio between said first retentate and said second permeate is selected among 1:1.2 to 1:0.5; 1:1.15 to 1:1; 1:1.10 to 1:0.98; 1:1 to 1:0.85; 1:1 to 1:0.5; 1:0.98 to 1:0.55; 1:0.96 to 1:0.60; 1:0.94 to 1:0.65; 1:0.92 to 1:0.70; 1:0.90 to 1:0.75; 1:0.88 to 1:0.78; 1:0.86 to 1:0.80; 1:0.85 to 1:0.82; and about 1:0.84. Preferably the mixing ratio is 1:1 to 1:0.5; more preferred 1:0.90 to 1:0.75, preferably 1:0.85 to 1:0.82.

According to an embodiment, the invention concerns the process, wherein the cut off of the filter used in step a) is 2500 Da-50000 Da, preferably 2000-20000 Da, more preferred about 10000 Da.

According to an embodiment, the invention concerns the process, wherein the cut off of the filter used in step b) is 100-400 Da, preferably 200-300 Da, more preferred about 250 Da.

According to an embodiment, the invention concerns the process for obtaining a milk product, wherein the concentration of lactose in the obtained milk is less than a value selected among 0.50%; 0.45%; 0.40%; 0.35%; 0.30%; 0.25%; 0.20%; 0.19%; 0.18%; 0.17%; 0.16%; 0.15%; 0.14%; 0.13%; 0.12%; 0.11%; 0.10%; 0.09%; 0.08%; 0.07%; 0.06%; 0.05%; 0.04%; 0.03%; 0.02%; and 0.01%. Preferably the concentration of lactose in the obtained milk is less than 0.50%, more preferred less than 0.10%, preferably less than 0.05%, more preferred less than 0.01%.

In a preferred embodiment of the present invention the lactose content may be determined by the method described by Mono & Di (Mono & Di; "Methods of Analysis for Nutrition Labeling"; (1993); chapter 33; Sugars.

According to an embodiment, the invention concerns the process for obtaining a milk product, wherein the concentration of calcium in the obtained milk product is selected among 0.05-0.19%; 0.06-0.18%; 0.07-0.17%; 0.08-0.16%; 0.09-0.15%; 0.095-0.145%; 0.100-0.140%; 0.105-0.135%; 0.110-0.130%; 0.115-0.125%; 0.118-0.121%; 0.119-0.120%; preferably about the calcium concentration in the original milk. Preferably the concentration of calcium in the obtained milk is 0.110-0.130%, more preferred 0.115-0.125%, preferably 0.118-0.121%, more preferred 0.119-0.120%.

According to an embodiment, the invention concerns the process for obtaining a milk product, wherein the concentration of protein in the obtained milk product is selected among 0.5-6.0%; 1.0-5.5%; 1.5-5.0%; 2.0-4.9%; 2.2-4.8%; 2.5-4.7%; 2.8-4.6%; 3.0-4.5%; 3.2-4.4%; 3.3-4.3%; 3.4-4.2%; 3.5-4.1%; 3.6-4.0%; 3.7-3.9%; and about 3.8%; preferably about the protein concentration in the original milk, or slightly higher. Preferably the concentration of protein in the obtained milk is 3.6-4.0%, more preferred 3.7-3.9%, preferably about 3.8%.

According to an embodiment, the invention concerns a process for obtaining a milk product, wherein the concentration of calcium in the obtained milk product is selected among 110-130 mg/100 g, 115-125 mg/100 g, and 118-122 mg/100 g, preferably about 120 mg/100 g milk. Preferably the concentration of calcium in the obtained milk is 110-130 mg/100 g, more preferred 118-122 mg/100 g, preferably about 120 mg/100 g milk.

According to an embodiment, the invention concerns process for obtaining a milk product, wherein the concentration of protein in the obtained milk product is selected among 3.4-3.9%, preferably 3.5-3.8%, more preferred 3.6-3.7% and preferably about 3.7%; preferably about the protein concentration in the original milk, more preferred slightly higher. Slightly increased protein contents improves the nutritional value of the milk. Surprisingly, the desired calcium contents may be obtained by closely monitoring and adjusting the protein concentration during the process.

It has surprisingly been found that the concentration of calcium may be retained at a high value, about the concentration in the original milk, without changing the pH during the process. This may be done by retaining a suitable amount of protein in the process, as calcium tends to bind to the protein. Hence, a protein content about the protein concentration in the original milk, or slightly higher, may be suitable. In accordance with this, a preferred embodiment of the invention concerns the production of milk with desired contents of calcium, such as about 118-122, preferably 120 mg/100 ml, by adjusting the amount of protein during the process.

According to an embodiment, the invention concerns a process for obtaining a milk product, wherein the concentration of chloride in the obtained milk product is selected among 75-105, preferably 80-100, more preferred 85-95, and preferably 88-90 mg/100 ml.

According to an embodiment, the invention concerns a process for obtaining a milk product, wherein the concentration of sodium in the obtained milk product is selected among 33-34, 32-35, 30-40, 25-45, and 20-50 mg/100 ml. It is desirable to avoid a high amount of sodium chloride in the diet. Preferably the concentration of sodium in the obtained milk product is 20-50 mg/100 ml, more preferred 30-40 mg/100 ml, preferably 33-34 mg/100 ml.

According to an embodiment, the invention concerns a process for obtaining a milk product, wherein the concentration of potassium in the obtained milk product is selected among 125-137, 126-134, 127-132, 128-130, and about 129 mg/100 ml. The contents of potassium are highly influential for the taste of the milk, and should be chosen accordingly. Preferably the concentration of potassium in the obtained milk product is 125-137 mg/100 ml, more preferred 127-132 mg/100 ml, preferably about 129 mg/100 ml.

According to an embodiment, the invention concerns a process for obtaining a milk product, wherein the concentration of carbohydrate in the obtained milk product is selected among less than 3.4, preferably less than 3.3, more preferred less than 3.2, preferably less than 3.1, more preferred less than 3.0, preferably less than 2.9 g/100 ml. It is desirable to limit the amount of carbohydrate in the diet.

According to an embodiment, the invention concerns the process, wherein the ratio of the lactose concentration before step d) to the lactose concentration of the original milk is selected among the ranges 0.25-0.75; 0.30-0.70; 0.35-0.65; 0.40-0.60; and 0.45-0.55; preferably about 0.50. Preferably the ratio of the lactose concentration just before step d) to the lactose concentration of the original milk is 0.30-0.70, more preferred 0.40-0.60, preferably about 0.50. During step d) lactose is usually hydrolysed to glucose and galactose, such that one mole of lactose provides one mole of glucose and one mole of galactose. One mole of glucose and one mole of galactose each contribute with about the same sweetness as one mole of lactose. Hence, bringing the lactose content to about a factor 0.50 before step d), as compared to the original milk product, may be used to preserve the sweetness originating from lactose in the original milk product, in the obtained product.

According to an embodiment, the invention concerns the process, wherein the lactose in the mixture is hydrolysed in step d) with lactase.

According to an embodiment, the invention concerns the process, wherein no additives and/or no stabilisers are used.

According to an embodiment, the invention concerns a milk product obtainable by a process according to the invention.

According to an embodiment, the invention concerns a milk product, wherein the variation between finished milk products of the concentration of at least one, preferably all, of chloride, potassium, magnesium and sodium is less than 5%. The coefficient of variation is here defined as the standard deviation divided by the mean. The standard deviation and the mean would usually be calculated using at least 4 samples. The measurements may be made on finished milk products, commercially available on the market.

According to an embodiment, the invention concerns a milk product, wherein the coefficient of variation between finished milk products of the concentration of at least one, preferably both, of ash and phosphorous is less than 5%.

According to an embodiment, the invention concerns a milk product, wherein the coefficient of variation between finished milk products of the concentration of at least one, preferably all, of calcium, enzymatic lactose, and protein is less than 5%.

According to an embodiment, the invention concerns a milk product, having the same sweetness and/or organoleptic properties as the original milk.

According to an embodiment, the invention concerns a milk product, obtained without addition of additives and/or stabilisers.

The process of the present invention may be used to obtain milk with different contents of fat, e.g. about 0.05%, 0.1%, 0.2%, 0.5%, 1.0%, 1.5%, 2.0%, 2.5%, 3.0%, or 3.5%; preferably 1.5%; or any suitable range of these indicated values.

In a preferred embodiment of the present invention the fat content may be determined by the gravimetric method described by Röse Gottlieb (The Röse Gottlieb method) (IDF, International Standard 1D; "Milk—Determination of Fat content—Gravimetric method"; International Dairy Federation; Brussels; Belgium; (1996).

According to an embodiment, the present invention concerns a milk product with reduced contents of energy.

According to an embodiment, the present invention concerns the use of a milk product according to the invention, as a finished milk product without further processing steps, or to manufacture yoghurt, curd, quark or acidified milk products.

It should be noted that aspects, embodiments and features described in the context of one of the aspects, embodiments or features of the present invention may also apply to other aspects, embodiments and features of the invention.

All patent and non-patent references cited in the present application are hereby incorporated by reference in their entirety.

The invention will now be described in further details in the following non-limiting examples.

EXAMPLES

Test panels did not discern any unpleasant taste of the milk product according to the invention. The milk product retained the taste and sweetness of the original milk.

Example 1

32 000 liters of semi-skimmed milk was feed to a first batch tank.

The semi-skimmed milk was ultrafiltrated to a concentration factor (CF) of 2.0 on a UF-unit, equipped with spiral elements (Desal; cut-off: 10 000 MW). The result was 16 000 liters of UF-retentate and 16 000 liters of UF-permeate.

The UF-permeate was processed, over a second batch tank, on a nanofiltration (NF) unit, equipped with spiral elements (Desal; cut-off: 200 MW). The CF is 5.0, resulting in 3 200 liters of NF-retentate and 12 800 liters of NF-permeate.

The 12 800 liters of NF-permeate were mixed with the 16 000 liters of UF-retentate in the first batch tank. The mix ratio of UFR:NFP is 1:0.8, resulting in 28 800 liters of lactose reduced semi-skimmed milk.

After reducing the lactose by filtration the lactose reduced semi-skimmed milk get a UHT at 143 C.° in 4 seconds and Lactase (Maxilact 2000 LG) is added in ad dosage of 0.01%.

After hydrolyzing the product the lactose concentration is less than 0.01%.

TABLE 1

| Lactose Reduced<br>Semi-skimmed milk | Unit | Original milk<br>(Semi.skimmed milk) | Product |
|---|---|---|---|
| Protein | % | 3.5 | 3.8 |
| Fat | % | 1.5 | 1.6 |
| Lactose | % | 4.8 | less than 0.01 |
| Carbon hydrate | % | 4.8 | 2.6 |
| Calcium | % | 0.122 | 0.119 |
| Energy | kJ/100 g | 200 | 170 |

With reference to FIG. 1, the contents of Batch tank 1 is the Original milk before the process. The Product will be present in Batch tank 1 after the process.

Comparison of Efficacy of Process and Loss During Process.

The efficacy of the process may be perceived as the ability of the process to convert the original milk into finished milk product without loss of original milk.

As described above, the present process allows for a total of 28.800 liters originating from the 32.000 liters of milk to be present in the final product. The efficacy is here 28.800/32.000=90%, i.e. the loss of original milk is 100%−90%=10%.

Compared to known processes, this provides a significant improvement.

WO 03/094623 describes a method in example 1, wherein 30 liters of original milk are required to produce 0.75 liters reverse osmosis retentate. 10.5 g reverse osmosis retentate are mixed with 69.2 g ultrafiltration retentate, i.e. for the 0.75 liters of reverse osmosis retentate, 0.75*(69.2/10.5)=4.94 liters of ultrafiltration retentate are used. In total 0.75±4.94=5.69 liters of the 30 liters of original milk is present in the final product. This provides for an efficacy of 19%, i.e. a loss of original milk of 81%. In example 2, 20 liters ultrafiltration retentate of 30 liters original milk are present in the final product. The loss is 33.3%.

Hence, an advantage of the present invention is the reduction of waste.

Example 2

Comparison Analysis

A number of products from the producer Valio were purchased in order to compare known products and products obtainable with the present process. The results are depicted in Table 1.

TABLE 1

|  | Valio | | | Present invention | | |
|---|---|---|---|---|---|---|
|  | Mean | Std. Dev. | CV | Mean | Std. Dev. | CV |
| Ash | 0.790 | 0.0216 | 3% | 0.716 | 0.0246 | 3% |
| Ca | 0.104 | 0.0007 | 1% | 0.118 | 0.0041 | 3% |
| Cl | 0.105 | 0.0100 | 10% | 0.089 | 0.0032 | 4% |
| Lactose | 2.95 | 0.0938 | 3% | 2.80 | 0.1129 | 4% |
| Fat | 1.50 | 0.0310 | 2% | 1.50 | 0.0641 | 4% |
| K | 0.125 | 0.0142 | 11% | 0.129 | 0.0021 | 2% |
| Mg | 0.011 | 0.0012 | 11% | 0.010 | 0.0003 | 3% |
| Na | 0.066 | 0.0166 | 25% | 0.034 | 0.0011 | 3% |
| pH | 6.84 | 0.0183 | 0% | 6.76 | 0.0042 | 0% |
| P | 0.093 | 0.0055 | 6% | 0.097 | 0.0036 | 4% |
| Protein | 3.4 | 0.0271 | 1% | 3.7 | 0.1084 | 3% |
| Carbohydrate | 3.0 |  |  | 2.8 |  |  |

Unless otherwise noted, the values of Table 1 are in g/100 ml, except for pH and CV.

Std. Dev. is the standard deviation.

CV, the coefficient of variation, is defined as the standard deviation divided by the mean.

The analysis further showed that there may be large differences between declared and actual values of the parameters. Valio has declared calcium contents of 120 mg/100 ml, but actual, measured contents of 104 mg/100 ml.

The Valio product appears to have been made according to the process of example 2 of WO 03/094623. This is indicated by the large salt concentration, such as of sodium, and partly chloride.

The present invention provides an improved product, as the calcium contents of 118 mg/100 ml is comparable to the recommended nutritional value of 120 mg/100 ml. This is an improvement of 14% compared to the Valio product. Furthermore, the amount of sodium is reduced by 49%, which is preferred, as too much salt in the diet is not recommended.

The invention claimed is:

1. A process for producing substantially lactose-free milk, comprising the steps of:
   a) filtering an original milk using a single ultrafiltration stage, obtaining a single processed ultrafiltered retentate and a single processed ultrafiltered permeate, wherein:
      the single processed ultrafiltered permeate comprises lactose, minerals, non-protein nitrogen (NPN) and water; and
      the single processed ultrafiltered retentate comprises fat, proteins, NPN, minerals, lactose and water;
   b) filtering said single processed ultrafiltered permeate using a single nanofiltration stage obtaining a single processed nanofiltered permeate and a nanofiltered retentate, wherein said single processed nanofiltered permeate comprises water, monovalent mineral ions and NPN;
   c) mixing said single processed ultrafiltered retentate with said single processed nanofiltered permeate obtaining a milk mixture, wherein the ratio of the lactose concentration of said milk mixture to the lactose concentration of the original milk is in a range between 0.25-0.75 of the original milk; and
   d) hydrolysing the milk mixture obtaining a substantially lactose-free milk comprising less than 0.5 wt % lactose, wherein no other stages of filtration are used in the processing of the substantially lactose-free milk.

2. A process according to claim 1, wherein no water is added during the process.

3. A process according to claim 1, wherein no non-milk originated minerals are added during the process.

4. A process according to claim 1, wherein the process is carried out under a pH that is about the same pH of the milk.

5. A process according to claim 1, wherein step a) has a concentration coefficient in an interval selected from the group consisting of 1.8-2.2, and 1.9-2.1.

6. A process according to claim 1, wherein step b) has a concentration coefficient in an interval selected from the group consisting of 3.5-4.7, 3.7-4.5, 3.8-4.4, 3.9-4.3, and 4.0-4.2.

7. A process according to claim 1, wherein lactose in the obtained hydrolysed milk is less than 0.50%, less than 0.45%, less than 0.40%, less than 0.35%, less than 0.30%, less than 0.25%, less than 0.20%, less than 0.19%, less than 0.18%, less than 0.17%, less than 0.16%, less than 0.15%, less than 0.14%, less than 0.13%, less than 0.12%, less than 0.11%, less than 0.10%, less than 0.09%, less than 0.08%, less than 0.07%, less than 0.06%, less than 0.05%, less than 0.04%, less than 0.03%, less than 0.02%, or less than 0.01%.

8. A process according to claim 1, wherein calcium in the obtained hydrolysed milk is about 110-130 mg/100 g, about 115-125 mg/100 g, about 118-122 mg/100 g, or about 120 mg/100 g milk.

9. A process according to claim 1, wherein protein in the obtained hydrolysed milk is about the same or higher than protein in the milk before processing.

10. A process according to claim 1, wherein chloride in the obtained hydrolysed milk is about 88-90 mg/100 ml, about 85-95 mg/100 ml, about 80-100 mg/100 ml, or about 75-105 mg/100 ml.

11. A process according to claim 1, wherein sodium in the obtained hydrolysed milk is about 33-34 mg/100 ml, about 32-35 mg/100 ml, about 30-40 mg/100 ml, about 25-45 mg/100 ml, or about 20-50 mg/100 ml.

12. A process according to claim 1, wherein potassium in the obtained hydrolysed milk is about 125-137 mg/100 ml, about 126-134 mg/100 ml, about 127-132 mg/100 ml, about 128-130 mg/100 ml, or about 129 mg/100 ml.

13. A process according to claim 1, wherein carbohydrate in the obtained hydrolysed milk is less than 3.4 g/100 ml, less than 3.3 g/100 ml, less than 3.2 g/100 ml, less than 3.1 g/100 ml, less than 3.0 g/100 ml, or less than 2.9 g/100 ml.

14. The process according to claim 5, wherein the concentration coefficient of step a) is about 2.0.

15. The process according to claim 6, wherein the concentration coefficient of step b) is about 4.1.

16. The process according to claim 9, wherein the protein in the obtained hydrolysed milk is about 3.5-3.8%, about 3.6-3.7%, or about 3.7%.

17. The process according to claim 1, wherein said hydrolysed milk has a calcium concentration of 0.11-0.13% and a protein concentration of 3.0-4.0%.

18. The process according to claim 17, wherein said hydrolysed milk has a sodium concentration of 20-50 mg/100 ml.

19. The process according to claim 1, wherein reversed osmosis is not used.

20. The process according to claim 1, wherein the lactose concentration in said mixture is between 1.5% and 4%.

* * * * *